United States Patent [19]

Pütz et al.

[11] Patent Number: 4,770,283

[45] Date of Patent: Sep. 13, 1988

[54] FRICTION RING FOR CLUTCHES OR BRAKES, AND A METHOD AND DEVICE FOR PRODUCING THE FRICTION RING

[75] Inventors: Hermann Pütz, Schongau; Ulrich Wollenteit, Munich, both of Fed. Rep. of Germany

[73] Assignee: Hoerbiger & Co., Im Forchet, Fed. Rep. of Germany

[21] Appl. No.: 888,405

[22] Filed: Jul. 23, 1986

[30] Foreign Application Priority Data

Mar. 21, 1986 [AT] Austria ................................. 765/86

[51] Int. Cl.⁴ .................... F16D 11/00; F16D 13/60; B23P 25/00
[52] U.S. Cl. ................... 192/107 M; 29/458; 29/460; 29/527.2; 192/53 F; 419/8; 419/28; 72/359
[58] Field of Search ................. 29/460, 527.2, 412, 29/458; 192/107 M, 53 F; 72/359; 419/8, 28

[56] References Cited

U.S. PATENT DOCUMENTS

| | | | |
|---|---|---|---|
| 2,289,311 | 7/1942 | Wellman | 419/8 |
| 2,389,061 | 11/1945 | Kuzmick | 192/107 M X |
| 2,793,427 | 5/1957 | Marvin | 419/8 |
| 3,390,750 | 7/1968 | Albertson | 192/107 M |
| 3,738,901 | 6/1973 | Malsushima et al. | 192/107 M X |
| 4,049,090 | 9/1977 | Buell | 192/107 M X |
| 4,679,681 | 7/1987 | Creydt et al. | 192/53 F X |
| 4,681,734 | 7/1987 | Simm et al. | 419/8 X |

FOREIGN PATENT DOCUMENTS 3417813 6/1985 Fed. Rep. of Germany .
1325304 8/1973 United Kingdom ............... 29/527.2

Primary Examiner—Charlie T. Moon
Attorney, Agent, or Firm—Watson, Cole, Grindle & Watson

[57] ABSTRACT

A friction ring for clutches and brakes consists of an annular metal element having at least one cylindrical or conical friction surface comprising a spray-sintered friction lining. The friction linings are directly sintered onto the annular element itself, the intially planar friction surfaces being formed, after applying the spray-sintered friction linings, into cylindrical or conical shape by a non-cutting shaping process such as stamping, deepdrawing or the like. The method of producing the friction ring comprises producing an annular metal element, applying a spray-sintered friction lining on to one or both sides thereof and shaping the annular element together with the sintered linings applied thereto into a cylindrical or conical form. The shaping is performed by means of a shaping tool comprising a die and an associated plunger working on the annular element. To avoid detrimental effect of the device to the porous spray-sintered friction lining, a layer or sheet of rubber or plastic is provided between the annular element and the shaping surface of the plunger and/or the die, respectively.

20 Claims, 3 Drawing Sheets

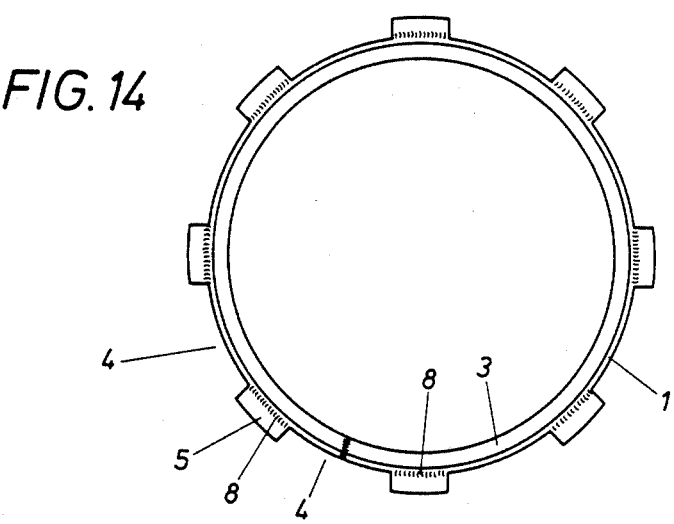
FIG. 14
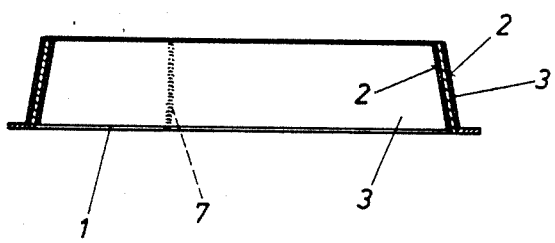
FIG. 13
FIG. 12
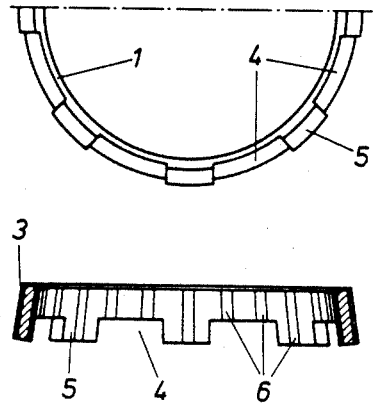
FIG. 10
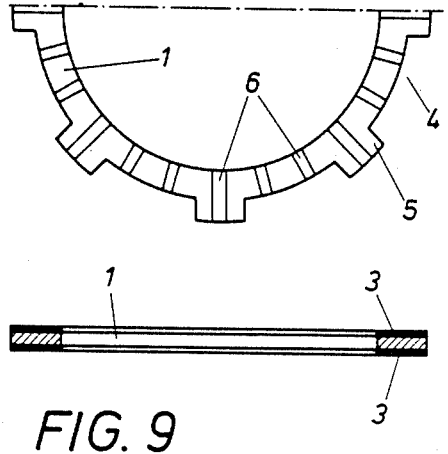
FIG. 11
FIG. 9

FRICTION RING FOR CLUTCHES OR BRAKES, AND A METHOD AND DEVICE FOR PRODUCING THE FRICTION RING

BACKGROUND OF THE INVENTION

1. Field of the Invention

The invention relates to a friction ring for clutches or brakes, and to a method and device for producing such friction rings, the friction ring, consisting of an annular metal element with at least one cylindrical or conical friction surface comprising a spray-sintered friction lining.

2. The Prior Art

Spray-sintered friction linings have been used satisfactorily for some time in clutches and brakes, as they possess good friction properties, are durable and temperature-resistant, and can be produced relatively simply with great accuracy. In their production, the sinter powder is sprayed onto a planar support plate and then sintered on, the necessary material concentration and the required gauged thickness being attained by one or more compacting operations. Planar discs produced by this method have given particularly satisfactory results in lubricated multiple disc clutches and brakes of various types, and also, for example, in automatic change-over gears of motor vehicles and other working machines of all types.

From German Pat. No. 34 17 813 it is known, in the case of a friction clutch or brake, particularly of a synchronising device, with non-planar friction surfaces, to use a separately prepared friction element consisting of a support plate on which a friction lining has been spray-sintered and has been compacted by pressing the friction element. This separately prepared friction element is brazed or welded onto the basic element with the non-planar friction surface or is securely fixed to the friction surface in some other way. Previously, the separately prepared friction element is formed at least approximately into the shape of the friction surface and then by means of rolling, including the use of engraved rollers, is fitted onto the basic element so that it becomes friction-locked, and at least over parts of its surface, positively locked. This known friction ring is thus composed of individual parts, so that the manufacturing tolerances become added together and can negatively affect the assembly conditions and the operation. Moreover, the fitting, the matched shaping and the secure fixing of the separately prepared friction element onto the non-planar friction surfaces is relatively costly. Particular production accuracy and care are required.

A further friction ring with a spray-sintered friction lining is known from British Pat. No. 1 325 304. In this, a cylindrically-shaped brake band, open in a circumferential position, is provided with a brake lining consisting of a support in the form of a flexible steel plate with a spray-sintered friction lining thereon and fixed to the brake band by spot welding. This known execution also uses a separately prepared friction element, and therefore conforms substantially to the friction clutch or brake described in German Pat. No. 34 17 813, and the same cost and care are involved in its production.

In the brake band described in British Pat. No. 1 325 304, the spray-sintered friction lining can be formed on the support plate either as a continuous layer or as spaced-apart portions of sintered friction material. These portions can be formed slightly curved during the sintering operation, so that the cylindrical shaping of the overall friction lining for its fitting on to the brake band can be done without difficulty. U.S. Pat. No. 2,793,427 also describes a separately prepared friction element for the same purpose, in which slots are formed in a spray-sintered friction lining on a support plate during the actual production thereof, for example by using a compacting plunger provided with ribs, the friction lining being simultaneously divided into portions so that the subsequent shaping of the friction lining into a non-plane friction surface is made easier.

Finally, German Patent Document No. 34 12 779 describes a method for producing a synchronising ring from a composite material, in which the metal layer forming the friction cone is bonded to a protective layer formed from another material. In this known method, circular shapes are firstly punched out of a composite material in the form of a steel-aluminium alloy strip, and these are then shaped into synchronising rings by a non-cutting shaping method, for example by stamping, deep-drawing or the like. In this case no spray-sintered friction lining is provided. The friction lining consists on the contrary of an aluminium alloy which is in combination with the annular element forming the support part as a composite material. This composite material is shaped by a non-cutting process into a friction ring with a cylindrical or conical friction surface, to form the synchronising ring.

SUMMARY OF THE INVENTION

The object of the invention is to simplify and improve known friction rings of the aforesaid type and their production, including the device to be used therefor, such that friction rings of any required shape can be produced with non-planar spray-sintered friction linings, without separately prepared friction elements having to be fitted to the friction surfaces.

This object is attained according to the invention in that the friction linings are directly sintered onto at least one cylindrical or conical friction surface of the annular element itself, the initially planar friction surfaces being formed, after applying the spray-sintered friction lining, into cylindrical or conical shape by a non-cutting shaping process such as stamping, deep-drawing or the like. In a friction ring formed in this manner, there is no need to separately produce and shape friction elements and fix them on to a basic element. The spray-sintered friction linings, which are directly sintered onto the annular elements, form together therewith a homogeneous machine component which can be simply and accurately produced, possesses long life and can be used advantageously in brakes, clutches and synchronising equipment.

In the prior art, only separately produced spray-sintered friction linings fitted to support plates were shaped and then together with the support plate formed into actual friction elements on friction rings. Only friction rings witout spray-sintered friction linings were cylindrically or conically shaped.

In contrast to this state of the art, the present invention teaches that it is also possible to shape by a non-cutting method relatively solid friction elements provided with spray-sintered friction linings, if care is taken in their production such that the spray-sintered friction linings are not damaged by tools which act directly on them, and are not subjected to disadvantageous compacting or deformation. By virtue of this teaching, the invention differs from previously known executions, and could in no way be deduced from the state of the art.

The method according to the invention for producing a friction ring is characterised by the following process steps:
- producing, preferably by punching, an annular metal element having on its upper and/or lower side a planar friction surface,
- applying a spray-sintered friction lining to the planar friction surfaces, including precompacting and possibly simultaneous impressing of grooving,
- shaping the sintered annular element by stamping, deep-drawing or the like, into a form in which the sintered friction surfaces are cylindrical or conical, and
- gauging and finally compacting the friction lining.

By means of this production method, friction rings provided on one or both sides with spray-sintered linings can in practice by means of a single process step be formed into their final shape after sintering. As has been found from practical experience, there surprisingly occurs no undue compacting of the porous spray-sintered lining, not even in the region of the edges of the friction lining. By subsequent gauging and final compacting, a further improvement in the properties of the friction lining can be obtained. This gauging and final compacting can if necessary take place in one process step together with the shaping of the sintered annular element.

In a further embodiment of the method according to the invention, during the production of the annular element but before applying the spray-sintered friction lining thereto, entrainment means in the form of protuberances or notches can be formed in the outer edge or in the inner edge thereof. These entrainment means can extend either axially in the generatrix direction or radially outwards or inwards. Advantageously, the entrainment means are already provided on the planar basic steel element in the form of the corresponding profile, and are bent therewith during the shaping process after sintering. They can be milled, punched or stamped.

Another possibility for forming the entrainment means according to the invention is, after shaping the sintered annular element, to weld entrainment means thereto. This embodiment is particularly advantageous if the entrainment means are in a form which is unsuitable for mechanical shaping or if different material characteristics are required between the basic element of the friction ring and the entrainment means.

A further modification to the production of a friction ring consists essentially according to the invention of the following process steps:
- producing a planar steel plate provided on at least one side with a spray-sintered friction lining,
- cutting a strip out of the sintered plate,
- bending the strip into a cylindrical or conical closed annular element, and
- welding together the abutting contact areas of the annular element.

This production method has the advantage that any deformation of the spray-sintered friction lining can be substantially avoided.

In order to produce a cylindrical friction ring, it is sufficient to merely bend a rectangular metal strip sintered on one or both sides until its ends meet. If the metal strip is of curved shape in its own plane, e.g. is in the form of an arc of a circle, a conical friction ring can be formed by bending it round until its ends meet. The friction ring formed into the required shape can then be gauged. This production method is particularly advantageous for brittle spray-sintered friction linings. Entrainment means can be welded to the finished ring so that they project axially or transversely to the ring axis.

The device according to the invention for shaping the sintered annular element consists of a shaping tool with a die and an associated plunger. According to the invention, an intermediate layer of yieldable material such as rubber or plastic is provided between the annular element and that shaping surface of the plunger which engages with a friction lining, and, if necessary, also between the annular element and the die. By this means, uniform loading of the spray-sintered friction lining is attained during the shaping of the annular element, so that no non-uniform compacting and no damaging of the friction lining occur. In particular, no disadvantageous alterations take place in the region of the edges of the friction lining.

According to a preferred embodiment of the device according to the invention, the intermediate layer of yieldable material consists of a sheet which is inserted between the annular element and the shaping tool which acts thereon. This sheet, which is advantageously of plastic, balances pressure differences which arise due to the geometrical profile and arrangement between the surface of the friction lining and the shaping surface of the shaping tool, or which arise during the actual shaping. By this means, the sintered annular element can in all cases be shaped easily and without danger. The sheet can be in the form of a continuous web guided to the shaping tool over rollers, in which case it is conveyed in steps corresponding to the respective size of the shaped annular element, and is wound for example on a winding spool.

According to a further characteristic of the invention, the intermediate layer of yieldable material can also be in the form of an insert provided in the shaping surface of the plunger and/or of the die. Damage to the spray-sintered friction lining during the shaping of the sintered annular element is also prevented by this means. Advantageously, the insert is of replaceable type, so that it can be replaced should it become damaged, or if the material composition of the spray-sintered friction lining requires an insert of other properties, eg., with regard to elasticity.

According to the invention, a further device for shaping the sintered annular element has proved advantageous, in which the shaping surface of the plunger and/or of the die is provided with bars projecting as humps, and which can be of rounded profile. On shaping the sintered annular element, the bars of the shaping tool firstly come into contact with the sintered lining, so that the sintered lining becomes more compacted in these positions. The result is however only the appearance of grooves which, during the operation of the friction ring, are more useful than disadvantageous. The friction lining between the grooves remains on the other hand unchanged, so that in these positions it is neither damaged nor undergoes unfavourable compacting. With this device, trouble-free shaping of the sintered annular element is possible without the spray-sintered friction lining becoming affected disadvantageously.

In the case of a friction lining with grooves or notches, the projecting bars can be so arranged that they engage in the grooves or notches. The purpose of this arrangement is to prevent damage to the friction lining during the shaping process. For this purpose, the bars are appropriately narrower than the grooves or notches in the friction lining, so that the grooves or notches become forced together during the shaping of the annular element, without them being obstructed by the bars. The bars are desirably taller than the grooves or notches impressed into the friction lining. It can, however, also be advantageous to make the bars somewhat shorter, and thus attain gauging or a post-compacting of the friction lining between the bars.

Further details and advantages of the invention will be more apparent from the description given hereinafter of some embodiments thereof, illustrated in the drawings.

DESCRIPTION OF THE DRAWINGS

FIGS. 9 and 10 show similar views of a further modification of the planar annular element, and FIGS. 11 and 12 are an axial central sectional view and plan view showing the friction ring formed by shaping the planar annular element of FIGS. 9 and 10.

FIG. 13 is an axial central section through a friction ring produced by a different method, and FIG. 14 is a plan view thereof.

DETAILED DESCRIPTION OF THE PREFERRED EMBODIMENTS

Figure 1:
FIGS. 1 and 2 show an axial central sectional view and partial plan view of a planar annular element.
Figure 3:
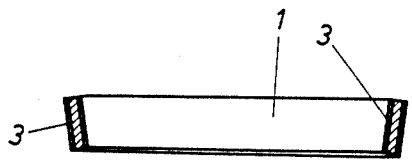
FIGS. 3 and 4 are a likewise axial central sectional view and partial plan view showing the annular element of FIGS. 1 and 2 when shaped into a friction ring.
Figure 2:
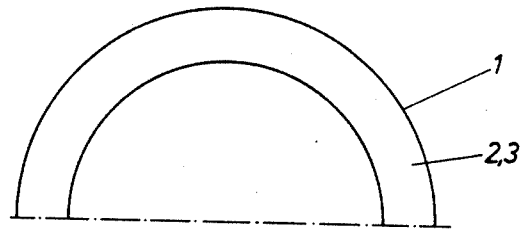
Figure 4:
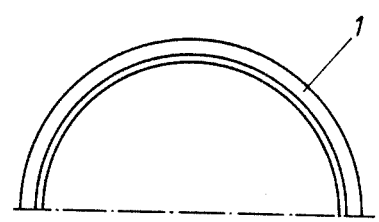

The friction rings shown in the drawings consist of an annular metal element 1 comprising on its two sides friction surfaces 2, each of which is provided with a spray-sintered friction lining 3. In FIGS. 1 and 2, the annular element 1 is a planar, flat ring with planar friction surfaces 2. In order to produce the friction lining, the sinter powder is sprayed on to the planar friction surfaces 2, and is then sintered, pressed and if necessary, gauged in known manner, so that a spray-sintered friction lining 3 is obtained which is suitable for the respective application. The friction lining 3 can be provided on both sides of the annular element 1, as shown in the embodiments, or a friction lining 3 can be provided on only one side, if a friction ring with only one friction surface is required for the respective application. As soon as the spray-sintered friction linings 3 have been completed, the annular element 1 together with the friction linings 3 is shaped into a cylindrical form or, as shown in FIGS. 3 and 4, into a slightly conical form by stamping, deep-drawing or the like. This shaping of the annular element 1 is possible without the spray-sintered friction lining 3 becoming deformed, chipped off or undesirably non-uniformly compacted.

Figure 5:
FIGS. 5 and 6 show an axial central sectional view and partial plan view of a further embodiment of a planar annular element.
Figure 6:
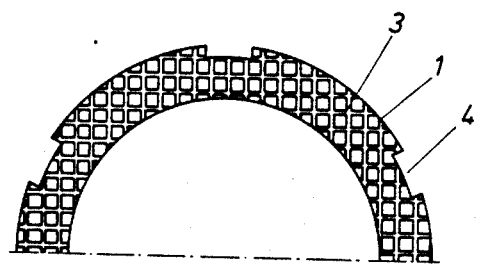

FIGS. 5 and 6 likewise show an initially planar annular element 1 with planar friction surfaces 2 on which spray-sintered friction linings 3 are provided. The friction linings 3 are grooved in waffle formation, as can be clearly seen in FIG. 6. In addition, entrainment notches 4 are provided, with projecting entrainment protuberances 5 therebetween. The entrainment notches 4 can be produced together with the planar annular element 1, e.g. by punching, but they can also be punched out, broached or milled subsequently. The entrainment notches 4 can be provided not only in the outer periphery of the annular element 1, as shown in the drawing, but they can also lie in the inner periphery. The waffle-formation grooving is desirably produced during the pressing of the spray-sintered friction lining, in known manner.

Figure 7:
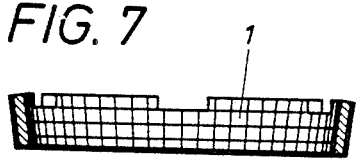
FIGS. 7 and 8 show similar views of the friction ring when formed from this annular element.
Figure 8:
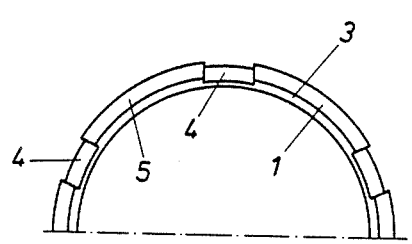

FIGS. 7 and 8 show the annular element 1 of FIGS. 5 and 6, provided with spray-sintered friction linings 3, after its shaping into a slightly conical form. The waffle-formation grooving can be seen diagrammatically on the inside of the annular element 1 in the sectional view of FIG. 7.

The initially planar annular element 1 of FIGS. 9 and 10 is provided with spray-sintered friction linings 3, in which radial grooves 6 are hollowed out. FIGS. 11 and 12 show the friction element shaped into a slightly conical form. Again in this case, entrainment notches 4 are provided, with projecting entrainment protuberances 5 therebetween.

A further embodiment of the friction ring according to the invention is shown in FIGS. 13 and 14. Again in this case the friction ring consists of an annular element 1, provided on both sides with friction surfaces 2 onto which friction linings 3 are spray-sintered. The annular element 1 is, however, in this case produced from a metal strip which, after the friction lining 3 has been sintered on, is bent into a closed ring and then welded together where the ends abut by means of a weld seam 7. The entrainment protuberances 5, which in this embodiment extend in a radial direction bent outwards from the annular element 1, are fixed to the annular element 1 subsequently by means of a weld seam 8.

Figure 15:
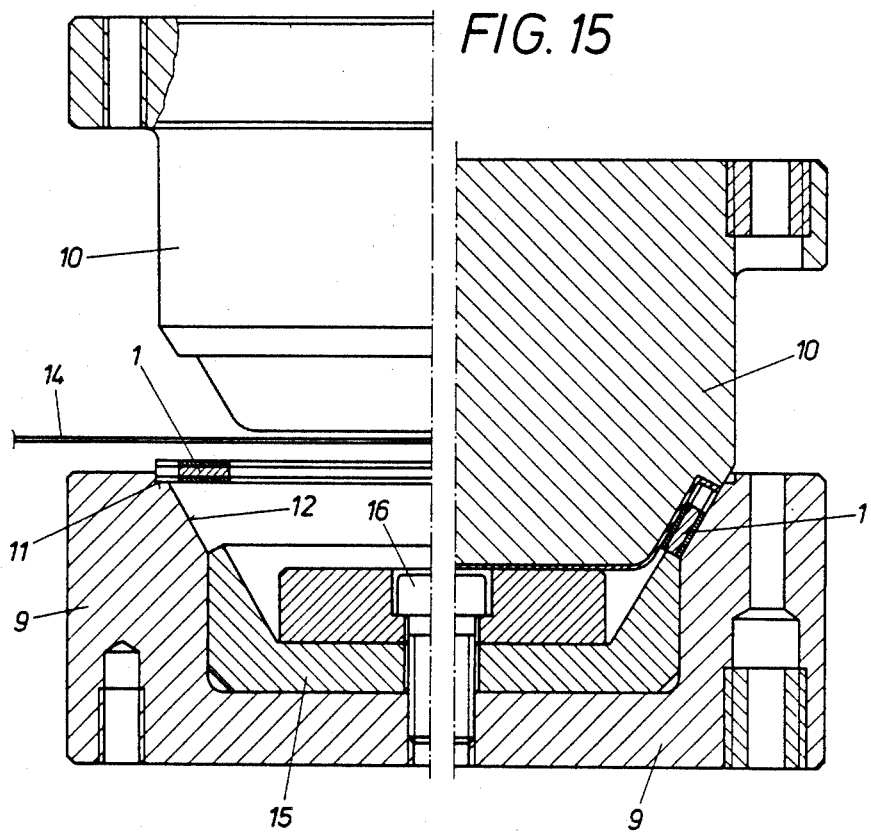
FIG. 15 is an axial central section through a device for producing friction rings.

FIG. 15 shows a device for shaping the sintered annular element 1. The left half shows the device in its open position before working on the annular element 1, whereas in the right half of FIG. 15 the device is shown closed, after the shaping of the annular element 1 is complete. This device consists of a shaping tool with a die 9 and a plunger 10 which is mobile against the die in the axial direction. The die 9 is provided on its upper edge with an annular step 11, into which the outer periphery of the annular element 1 is inserted. In its interior, the die 9 comprises a conically extending shaping surface 12. The plunger 10 comprises at its lower end a conical shaping surface 13 which matches the shaping surface 12 of the die 9. When the plunger 10 is moved from its open position shown in the left half of FIG. 5 into its closed position shown in the right half, the annular element 1 becomes conically shaped under the action of the shaping surface 13 of the plunger 10, which urges the annular element 1 against the shaping surface 12 of the die 9.

During the shaping of the annular element 1, in order to prevent the porous spray-sintered friction lining 3 fixed thereon becoming disadvantageously compacted or damaged, between the annular element 1 and the shaping surface 13 of the plunger 10 there is inserted an intermediate layer of yieldable material.

In the embodiment shown in FIG. 15 this intermediate layer is a sheet 14, for example of plastic. This can be fed to the shaping tool as a continuous web by way of rollers, not shown, and wound up, for example with the aid of a spool operated in accordance with the working cycle. If required, an intermediate layer of yieldable material such as plastic or rubber can also be inserted between the shaping surface 12 of the die 9 and the annular element 1. An annular end stop 15 for the annular element 1 is also fixed in the die 9 with the aid of a screw 16. From the right half of FIG. 15 it can be seen that the shaped annular element 1 lies with its front end against the end stop 15.

Figure 16:
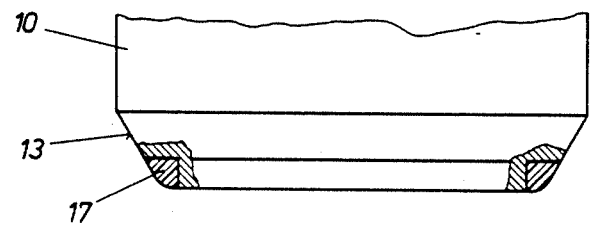
FIGS. 16 and 17 show details of a shaping tool.

FIG. 16 shows a modification in which the shaping plunger 10 is provided in the region of the shaping surface 15 with an insert 17 of yieldable material, for example of plastic. The insert 17 assumes the function of the sheet 14 shown in FIG. 15, which can thus be dispensed with.

Figure 17:
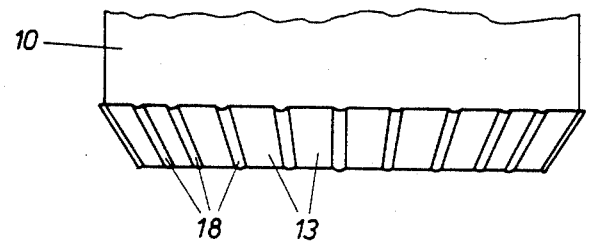

A further modification is shown in FIG. 17. In this case the plunger 10 is provided in the region of the shaping surface 13 with hump-type bars 18 projecting from it and distributed over the shaping surface 13. The shaping plunger 10 formed in this manner acts only in the region of the possibly rounded profiled bars 18 against the spray-sintered friction lining 3 of the friction element 1 to be shaped, by which means the shaping process is unable to result in any imparing of the spray-sintered friction lining 3 over the major part of its surface. If the friction lining 3 is provided with radial grooves 6, as in the case of the embodiment shown in FIGS. 9 to 12, the bars 18 can be arranged and dimensioned such that they become inserted into the radial grooves 6 during the shaping of the annular element 1.

What is claimed is:

1. A friction ring for use in clutches, brakes and synchronizing equipment, said friction ring consisting of an annular metallic element which has at least one cylindrical or conical face and an uneven lining of powdered friction material attached to at least one said cylindrical or conical face of said annular metallic element, said friction ring being formed by the steps of:
   (a) providing a flat metallic ring which has opposite planar surfaces,
   (b) spraying a layer of powdered friction material onto at least one of said opposite surfaces of said flat metallic ring,
   (c) sintering said at least one said layer of powdered friction material so that it becomes attached to the surface of said flat metallic ring on which it was sprayed, and
   (d) reshaping said flat metallic ring with said at least one sintered layer of powdered friction material so that it has a cylindrical or conical shape.

2. A friction ring as defined in claim 1, including prior to step (d) the step of impressing groovings in at least one said layer of powdered friction material.

3. A friction ring as defined in claim 1, wherein said flat metallic ring provided in step (a) has an inner edge and an outer edge, and wherein at least one of said inner edge and said outer edge includes entrainment protuberances and notches therebetween.

4. A friction ring as defined in claim 1, including after step (d) the step (e) of welding entrainment protuberances to said reshaped flat metallic ring.

5. A friction ring as defined in claim 4, wherein said reshaped flat metallic ring defines a central axis, and wherein in step (e) said entrainment protuberances are welded to said reshaped flat metallic ring to extend axially with said central axis.

6. A friction ring as defined in claim 4, wherein said reshaped flat metallic ring defines a central axis, and wherein in step (e) said entrainment projections are welded to said reshaped flat metallic ring to extend transversely to said central axis.

7. A friction ring as defined in claim 4, wherein said entrainment means have no friction material thereon.

8. A friction ring for use in clutches, brakes and synchronizing equipment, said friction ring consisting of an annular metallic element which has at least one cylindrical or conical face and an uneven lining of powdered friction material attached to at least one said cylindrical or conical face of said annular metallic element, said friction ring being formed by the steps of
   (a) providing a flat metallic plate which has opposite planar surfaces,
   (b) spraying a layer of a powdered friction material onto at least one of said opposite planar surfaces of said flat metallic plate,
   (c) sintering said at least one layer of powdered friction material so that it becomes attached to the surface of said flat metallic plate on which it was sprayed,
   (d) cutting a strip out of said flat metallic plate with said at least one sintered layer of powdered friction material, said strip having opposite ends,
   (e) bending said strip such that the opposite ends thereof abut one another, thus providing a cylindrical or conical closed annular element, and
   (f) welding said abutting ends of said closed annular element.

9. A friction ring for clutches or brakes, consisting of an annular metal element (1) with at least one cylindrical or conical friction surface (2) comprising a spray-sintered friction lining (3), characterized in that the friction lining (3) is directly sintered on to at least one cylindrical or conical friction surface (2) of the annular element (1) itself, the initially planar friction surface (2) being formed, after applying the spray-sintered friction lining (3), into cylindrical or conical shape by a non-cutting shaping process such as stamping, deep-drawing or the like.

10. A method of producing a friction ring which is useful in clutches, brakes and synchronizing equipment, said method comprising the steps of
   (a) providing a flat metallic ring having opposite planar surfaces and inner and outer peripheral edges,
   (b) spraying a layer of powdered friction material onto at least one of said planar surfaces of said flat metallic ring,
   (c) sintered said at least one said layer of powdered friction material, and
   (d) reshaping said flat metallic ring with said at least one sintered layer of powdered friction material thereon so that it has a cylindrical or conical shape.

11. The method as defined in claim 10, wherein in step (a) said flat metallic ring is punched from a flat metallic plate.

12. The method as defined in claim 10, wherein in step (d) said flat metallic ring with sintered layer of powdered friction material thereon is stamped into a cylindrical or conical shape.

13. The method as defined in claim 10, wherein in step (d) said flat metallic ring with sintered layer of powdered friction material thereon is deep-drawn into a cylindrical or conical shape.

14. The method as defined in claim 10, including prior to step (d) a step of impressing groovings in at least one said layer of powdered friction material.

15. The method as defined in claim 10, wherein at least one of the inner and outer peripheral edges of the flat metallic ring provided in step (a) provides entrainment protuberances and notches therebetween.

16. The method as defined in claim 10, including after step (d) a step of welding entrainment protuberances to at least one of the inner and outer peripheral edges of the reshaped flat metallic ring.

17. The method as defined in claim 10, including after step (d) the steps of gauging and compacting said at least one sintered layer of friction material.

18. A method of producing a friction ring which is useful in clutches, brakes and synchronizing equipment, said method comprising the steps of
   (a) providing a flat metallic plate having opposite planar surfaces,
   (b) spraying a layer of powdered friction material onto at least one of said planar surfaces of said flat metallic plate,
   (c) sintering said at least one layer of powdered friction material,
   (d) cutting a strip out of said flat metallic plate with said at least one sintered layer of powdered friction material, said strip having opposite ends,
   (e) bending said strip such that the opposite ends thereof abut one another, thus providing a cylindrical or conical closed annular element, and
   (f) welding said abutting ends of said annular element.

19. The method as defined in claim 18, wherein said annular element defines a central axis, and including after step (f) a step of welding entrainment projections to said annular element, such that they extend axially with said central axis.

20. The method as defined in claim 18, wherein said annular element defines a central axis, and including after step (f) a step of welding entrainment projections to said annular element, such that they extend transversely to said central axis.

* * * * *